3,247,187
OXIDATION OF 1,4-BENZODIAZEPINES TO 1,4-BENZODIAZEPIN-2-ONES

Rodney Ian Fryer, West Orange, and Leo Henryk Sternbach, Upper Montclair, N.J., assignors to Hoffmann-La Roche Inc., Nutley, N.J., a corporation of New Jersey
No Drawing. Filed July 10, 1963, Ser. No. 294,142
9 Claims. (Cl. 260—239.3)

This invention relates to the oxidation of 1,4-benzodiazepines. Products obtainable by the process of this invention are known compounds and are useful as sedatives, tranquilizers, anti-convulsants and muscle relaxants. More particularly, the present invention relates to the oxidation of 5-phenyl-1,4-benzodiazepines.

In one aspect, the present invention relates to a method for the preparation of a compound selected from the group consisting of compounds of the formulae

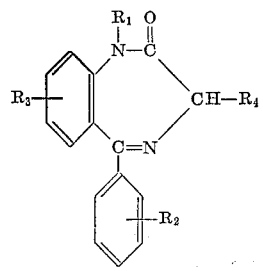

(I)

and

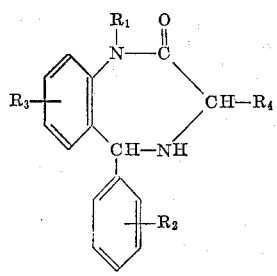

(II)

wherein $R_1$ and $R_4$ are each selected from the group consisting of hydrogen and lower alkyl; and $R_2$ and $R_3$ are each selected from the group consisting of hydrogen, halogen, nitro, lower alkyl and trifluoromethyl;

which comprises the oxidation of a compound selected from the group consisting of compounds of the formulae

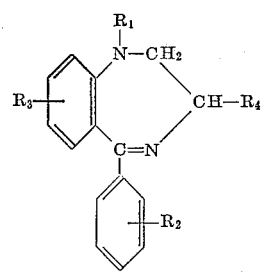

(III)

and

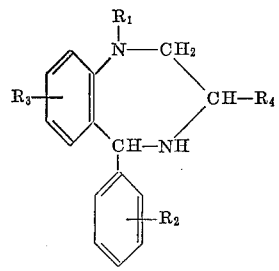

(IV)

wherein $R_1$, $R_2$, $R_3$ and $R_4$ have the same meaning as above.

In a second aspect, the present invention relates to a method for the preparation of a compound of the formula

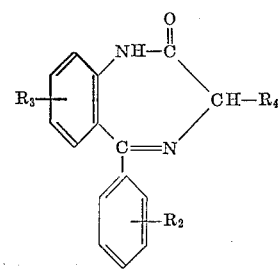

(V)

wherein $R_2$ and $R_3$ are each selected from the group consisting of hydrogen, halogen, trifluoromethyl, lower alkyl and nitro; and $R_4$ is selected from the group consisting of hydrogen and lower alkyl;

which comprises the oxidation of a compound of the formula

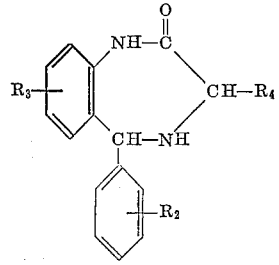

(VI)

wherein $R_2$, $R_3$ and $R_4$ have the same meaning as above.

As used herein the term "lower alkyl" relates to both straight and branched chain saturated hydrocarbon groups, for example, methyl, ethyl, propyl, isopropyl and the like. The term "halogen" relates to all four halogens, i.e. iodine, fluorine, bromine and chlorine. Moreover, chlorine, fluorine and bromine are preferred. In the above formulae, $R_2$ is preferably either hydrogen or a substituent in the ortho-position, and is preferably trifluoromethyl, fluorine or chlorine. $R_3$ is preferably in the 7-position of the benzodiazepine moiety and is preferably chlorine, fluorine, bromine, nitro or trifluoromethyl. In another preferred aspect, $R_1$ is hydrogen or methyl.

In one aspect of the present invention a compound of Formula III is oxidized to a compound of Formula I or a compound of Formula IV is oxidized to a compound of Formula II. These oxidations both result in the introduction of oxygen into the 2-position of a 5-phenyl-1,4-benzodiazepine molecule. This result is suitably effected by means of an agent containing in combination with oxygen, a metal at valence higher than its principal valence, said metal being selected from the group consisting of vanadium, chromium, manganese and lead. By principal valence is meant that valence of the metal in which it has the largest number of stable compounds, i.e. compounds containing the metal at the principal valence tend to be more stable than compounds containing the same metal at a different valence. Thus, the principal valence for vanadium and chromium is 3, whereas the principal valence for manganese and lead is 2. Exemplary oxidants for the above purpose are lead peroxide, vanadium pentoxide, chromic acid, and the permanganate ion. Preferred oxidants are those formed from chromium and manganese in combination with oxygen at their higher valences, for example, chromic acid or the permanganate ion. Chromic acid is especially preferred, and is used herein to include $H_2CrO_4$ (i.e. an aqueous solution of chromium trioxide) as well as chromium trioxide dissolved in organic solvents, e.g. in acetic acid, pyridine or the like.

The oxidants referred to above can either be added to a solution containing the compound of Formula III or IV to be oxidized, or the compound to be oxidized can be added to a solution containing the oxidant, or the oxidant can be formed in situ. Especially preferred is the use of chromic acid formed in situ. This can be effected, for example, by the addition of chromium trioxide and an acid, for example, sulfuric acid, to the reaction mixture.

In the above-described oxidation of compounds of Formulae III and IV, concentration of the reactants in the reaction mixture is not critical, but the oxidant should be present in a slight excess of the stoichiometric amount, i.e. in excess of one stoichiometric equivalent but less than two stoichiometric equivalents. The time of the reaction will vary with the specific reactants chosen, i.e. with the specific compound being oxidized and the specific oxidant being used. The temperature of the reaction is suitably determined by the solubility of the reactants in the reaction medium, i.e. the reaction temperature should suitably be one at which the reactants are miscible in the reaction medium. As the reaction medium, there can be used water, ketones, acids (both organic and inorganic), hydrocarbons, ethers, or the like, as well as mixtures thereof. Suitably, the reaction medium itself should not be easily oxidizable. As exemplary organic solvents, i.e. reaction media, there can be named, acetone and acetic acid. It has been found suitable when using acetone as the solvent, to conduct the reaction at room temperature or an elevated temperature up to the reflux temperature of acetone. However, when using acetic acid, it has been found most convenient to conduct the reaction at room temperature or below. Accordingly, the most convenient reaction temperature (in terms of obtaining the best yield and optimum facility of the reaction) will depend upon the reaction medium chosen for any specific set of reactants.

In a different aspect of the present invention, a compound of Formula VI is oxidized to a compound of Formula V. This oxidation results in the loss of one mole of hydrogen from 1,5-phenyl-1,3,4,5-tetrahydro-2H-benzodiazepin-2-one of Formula VI with the resultant formation of a corresponding 1,3-dihydro-5-phenyl-2H-1,4-benzodiazepin-2-one of Formula V. In contrast to the oxidation of compounds of Formulae III and IV, which oxidation requires the use of a strong oxidant, the removal of hydrogen from a compound of Formula VI can be effected either with weak or strong oxidants. Thus, a strong oxidant such as chromic acid utilized in the above-discussed oxidation of compounds of Formulae III and IV can also be used for the oxidation of a compound of Formula VI. On the other hand, weaker oxidants can also be used for this latter purpose.

The oxidant used for converting a compound of Formula VI to a compound of Formula V is an inorganic oxidant, suitably one selected from the group of inorganic oxidants wherein the metal constituent thereof undergoes, during the oxidation, reduction from a higher valence to a lower valence, or from the group of inorganic oxidants wherein the metal constituent of a metal oxide is reduced to the elemental metal during the oxidation. Thus, suitable as oxidants which can be used to effect the conversion of a compound of Formula VI to a compound of Formula V are, for example, dehydrogenation agents such as mercuric acetate, ferric chloride, ferricyanide ion, mercuric oxide, manganese dioxide, selenium dioxide, silver oxide and chromic acid. The latter three agents are preferred.

The concentration of the reactants is not critical but the oxidant should preferably be used in a slight stoichiometric excess of the compound of Formula VI which is being oxidized. By a slight stoichiometric excess is meant an amount in excess of one stoichiometric equivalent but less than two stoichiometric equivalents. The temperature suitable for the reaction will vary with the specific reactant and, especially, with the specific oxidant being used. The oxidants per se are known in the art and have been used previously in oxidation reactions. It has been found that the conditions conventionally employed in the art for the use of these oxidants will successfully effect dehydrogenation of the 4,5-position of a compound of Formula VI without concomitant splitting of the benzodiazepine moiety. The reaction media utilized can suitably be those generally used in the art with the oxidant being used. Preferably, the reaction medium should be inert to the oxidant. It should be noted that the choice of temperature (in terms of yield and facility of reaction) at which to conduct the reaction is also dependent upon the reaction medium selected.

The following examples are illustrative but not limitative of the invention. All temperatures are stated in ° C. and all melting points are corrected.

*Example 1*

A solution of 2.0 g. of chromium trioxide in a small amount of water (2 ml.), was added to a solution of 5.45 g. of 7-chloro-1,3,4,5-tetrahydro-5-phenyl-2H-1,4-benzodiazepin-2-one in 50 ml. of glacial acetic acid. The mixture was allowed to stand at room temperature for 12 hours, diluted with ice water and made basic (pH 8) with ammonium hydroxide. The precipitate was filtered and dissolved in dichloromethane. The resultant dichloromethane solution was then washed with water, dried and concentrated. Recrystallization of the residue from acetone gave 7-chloro-1,3-dihydro-5-phenyl-2H-1,4-benzodiazepin-2-one melting at 216–217°.

*Example 2*

A mixture of 1.28 g. of 7-chloro-1,3,4,5-tetrahydro-5-phenyl-2H-1,4-benzodiazepin-2-one, 1.0 g. of selenium dioxide, 1.4 ml. of pyridine and 100 ml. of tertiary butanol was heated at 60° for 30 minutes. The mixture was then cooled and filtered over a filter aid (Celite). Evaporation of solvents yielded a pink residue which was recrystallized from methanol yielding 7-chloro-1,3-dihydro-5-phenyl-2H-1,4-benzodiazepin-2-one melting at 216–217°.

*Example 3*

A suspension of 1.43 g. of 7-chloro-1,3,4,5-tetrahydro-5-phenyl-2H-1,4-benzodiazepin-2-one, in a solution of 1.8 g. of silver nitrate in 0.4 ml. of ethanol and 4.0 ml. of water was treated with a solution of 0.8 g. of sodium hydroxide in 5.6 ml. of water. The mixture was shaken at room temperature for 18 hours. The solids were then removed by filtration and washed with dichloromethane. The filttrate was made acidic with dilute sulfuric acid and extracted with dichloromethane. All the organic fractions were combined, washed with water and concentrated. Recrystallization of the residue from methanol yielded 7-chloro-1,3-dihydro-5-phenyl-2H-1,4-benzodiazepin-2-one melting at 216–217°.

*Example 4*

According to the procedure of Example 1 above, 7-chloro - 5 - (2 - fluorophenyl - 1,3,4,5 - tetrahydro - 2H-1,4-benzodiazepin-2-one was reacted with chromium trioxide in glacial acetic acid. The reaction time was 3½ hours. There was thus obtained 7-chloro-1,3-dihydro-5-(2-fluorophenyl)-2H-1,4-benzodiazepin-2-one melting at 205–206°.

*Example 5*

According to the procedure of Example 1 above, 5-(4-chlorophenyl) - 1,3,4,5 - tetrahydro - 2H - 1,4 - benzodiazepin-2-one was reacted with chromium trioxide in glacial acetic acid. The reaction time was 12 hours. There was thus obtained 5-(4-chlorophenyl)-1,3-dihydro-2H-1,4-benzodiazepin-2-one melting at 268–271° (dec.).

The above starting material, 5-(4-chlorophenyl)-1,3,4,5-tetrahydro-2H-1,4-benzodiazepin-2-one and its method of preparation are not a part of this invention but such are disclosed hereinbelow in order that this disclosure may be complete.

A suspension of 1 g. of platinum oxide in 500 ml. of acetic acid was reduced to completion with hydrogen. A solution of 15.0 g. of 5-(4-chlorophenyl)-1,3-dihydro-2H-1,4-benzodiazepin-2-one in 500 ml. of acetic acid was then added thereto and the mixture reduced to completion. Hydrogen uptake stopped at 1.3 l., the catalyst was filtered over a filter aid (Celite) and the filtrate concentrated under reduced pressure to an oil. The residue was crystallized from a mixture of acetone and petrol to give 5-(4-chlorophenyl)-1,3,4,5-tetrahydro-2H-1,4-benzodiazepin-2-one as white prisms melting at 190–195°.

*Example 6*

According to the procedure of Example 1 above, 5-(3-nitrophenyl) - 1,3,4,5 - tetrahydro - 2H - 1,4 - benzodiazepin-2-one was reacted with chromium trioxide in glacial acetic acid. The reaction time was 12 hours. There was thus obtained 1,3 - dihydro - 5 - (3 - nitrophenyl) - 2H-1,4-benzodiazepin-2-one melting at 224–227°.

The above starting material, 5-(3-nitrophenyl)-1,3,4,5-tetrahydro-2H-1,4-benzodiazepin-2-one and its method of preparation are not a part of this invention but such are disclosed hereinbelow in order that this disclosure may be complete.

A solution of 34 g. of 5-phenyl-1,3,4,5-tetrahydro-2H-1,4-benzodiazepin-2-one in 100 ml. of concentrated sulfuric acid was cooled to approximately −30° in a Dry Ice acetone bath. A solution of 7 ml. of 90 percent nitric acid in 20 ml. of concentrated sulfuric acid was then added slowly thereto, keeping the temperature constant. The reaction mixture was then allowed to warm to room temperature and was stirred overnight. The solution was then cooled to −10° and carefully made basic (pH 8) at this temperature with ammonium hydroxide. The product was extracted into dichloromethane which was washed, dried and evaporated. The residue was dissolved in methanol and the resultant crystals of 5-(4-nitrophenyl)-1,3,4,5-tetrahydro-2H-1,4-benzodiazepin - 2 - one melting at 222–228° filtered off. The mother liquors were then concentrated and the residue dissolved in 75 ml. of acetone. Addition of 25 ml. of 11.5 N methanolic hydrogen chloride precipitated 5-(3-nitrophenyl)-1,3,4,5-tetrahydro-2H-1,4-benzodiazepin-2-one as the hydrochloride which was removed by filtration and recrystallized from methanol and melted at 285–300°. Free base was liberated with 3 N sodium hydroxide solution and extracted into methylene chloride. The methylene chloride layer was washed, dried and evaporated to give, after recrystallization from methanol, 5-(3-nitrophenyl)-1,3,4,5-tetrahydro-2H-1,4-benzodiazepin-2-one as white needles melting at 158–160°.

*Example 7*

According to the procedure of Example 1 above, 1,3,4,5-tetrahydro-5-(4-nitrophenyl)-2H-1,4-benzodiazepin - 2-one was reacted with chromium trioxide in glacial acetic acid. The reaction time was 12 hours. There was thus obtained 1,3-dihydro-5-(4-nitrophenyl)-2H - 1,4 - benzodiazepin-2-one melting at 279–281°.

The starting material 1,3,4,5-tetrahydro-5-(4 - nitrophenyl)-2H-1,4-benzodiazepin-2-one and its method of preparation are not a part of this invention but such are disclosed in Example 6 above in order that this disclosure may be complete.

*Example 8*

According to the procedure of Example 1 above, 7-fluoro-1,3,4,5-tetrahydro-5-(4-chlorophenyl) - 2H - 1,4-benzodiazepin-2-one was reacted with chromium trioxide in glacial acetic acid. The reaction time was 12 hours. There was thus obtained 7-fluoro-1,3-dihydro-5-(4-chlorophenyl)-2H-1,4-benzodiazepin-2-one melting at 230–232°.

The starting material 7-fluoro-1,3,4,5-tetrahydro-5-(4-chlorophenyl)-2H-1,4-benzodiazepin-2-one and its method of preparation are not a part of this invention but such are disclosed hereinbelow in order that this disclosure may be complete.

A mixture of 111 g. of p-fluoroaniline and 392 g. of p-chlorobenzoyl chloride was gradually heated to 150°. When the initial reaction had subsided, 174 g. of zinc chloride was added and the temperature of the reaction mixture was raised to 220°. The reaction mixture was maintained at 210–220° for 40 minutes and was then quenched by the careful addition of 500 ml. of 3 N hydrochloric acid. The hot acid was decanted and the residue was hydrolyzed by heating for 36 hrs. under reflux with a mixture of 650 ml. of concentrated sulfuric acid, 500 ml. of acetic acid and 350 ml. of water. The acid solution was cooled, diluted with water and brought to pH 8 with sodium hydroxide. The ketone was extracted into dichloromethane which was washed with 1 N hydrochloric acid and then with water. The organic layer was dried and concentrated. The product was crystallized from ligroin (B.P. 100–120) to give 2-amino-4'-chloro-5-fluorobenzophenone as yellow prisms melting at 97–98°.

A solution of 62.5 g. of bromoacetyl bromide in 27 ml. of benzene was added over a period of 40 minutes to a stirred and heated solution of 64.6 g. of 2-amino-4'-chloro - 5 - fluorobenzophenone in 300 ml. of benzene. After the addition was complete the mixture was heated under reflux for 1 hr. and then poured into 1 l. of water. The layers were separated and the organic layer was washed with a 20 percent aqueous solution of sodium carbonate and then with water until the washings were neutral. Removal of the solvent and recrystallization of the residue from methanol gave 2-bromo-2'-(4-chlorobenzoyl)-4'-fluoroacetanilide as white needles melting at 144–145°.

A solution of 55.1 g. of 2-bromo-2'-(4-chlorobenzoyl)-4'-fluoroacetanilide in 200 ml. of dichloromethane was carefully added to 300 ml. of liquid ammonia. The mixture was allowed to stand for 30 minutes and then the ammonia was evaporated. The dichloromethane solution was washed with water, dried and concentrated to a gum, which was dissolved in 150 ml. of ethanol and heated under reflux for 2 hrs. The solution was cooled and the product, 5-(4-chlorophenyl)-1,3-dihydro-7-fluoro-2H-1,4-benzodiazepin-2-one melting at 232–233°, was obtained by filtration.

A solution of 10 g. of 5-(4-chlorophenyl)-1,3-dihydro-7-fluoro-2H-1,4-benzodiazepin-2-one in a mixture of 100 ml. of acetic acid and 15 ml. of water was hydrogenated to completion over a platinum catalyst (100 mg. of platinum oxide). The catalyst was removed by filtration and the filtrate was evaporated under reduced pressure.

The residue was dissolved in dichloromethane which was then washed with a 20 percent aqueous solution of sodium carbonate and then with water until the washings were alkali free. The organic layer was dried and evaporated. The residual gum was crystallized from an acetone, hexane mixture to give 5-(4-chlorophenyl)-1,3,4,5-tetrahydro-7-fluoro-2H-1,4-benzodiazepin-2-one as white prisms melting at 178–179°.

Example 9

A solution of 1.0 g. of 2,3-dihydro-7-nitro-5-phenyl-1H-1,4-benzodiazepine in 250 ml. of purified acetone was treated under an atmosphere of dry nitrogen with 0.936 ml. of chromate reagent (the acetone was purified and the chromate reagent prepared according to the method of Djerassi et al., J. Org. Chem. 21: 1547 (1956). The mixture was heated and allowed to reflux for 1 hour and then poured into 1.5 l. of cold water. The product was extracted into dichloromethane and the extract was washed and concentrated. Recrystallization of the residue from methanol gave a first crop of prisms of unreacted starting material. A second group of prisms was treated with ether and the ether soluble portion was crystallized to yield 1,3-dihydro-7-nitro-5-phenyl-2H-1,4-benzodiazepin-2-one melting at 224–226°.

Example 10

A solution af 1.0 g. of 2,3-dihydro-7-nitro-5-phenyl-1H-1,4-benzodiazepine in 15 ml. of glacial acetic acid was treated at room temperature with 0.936 ml. of chromate reagent (prepared in the same manner as the chromate reagent used in Example 9) and stirred for 30 minutes. The mixture was then poured into 800 ml. of water, made basic with ammonium hydroxide and extracted with dichloromethane. The organic layers were then combined, washed, dried and filtered over neutral alumina (Woelm Grade I). The alumina was eluted with dichloromethane and washed with methanol. The solvent was then removed and the residue recrystallized giving 1,3-dihydro-7-nito-5-phenyl-2H-1,4-benzodiazepin-2-one melting at 224–226°.

Example 11

According to the procedure of Example 9 above, 7-chloro-2,3-dihydro-5-phenyl-1H-1,4-benzodiazepine was reacted with chromium trioxide in dilute sulfuric acid and acetone. The reaction time was 3 hours and the product was 7-chloro-1,3-dihydro-5-phenyl-2H-1,4-benzodiazepin-2-one melting at 216–217°.

Example 12

According to the procedure of Example 10 above 2,3-dihydro-7-nitro-5-phenyl-1H-1,4-benzodiazepine was reacted with chromium trioxide in sulfuric acid and glacial acetic acid. The reaction time was 18 hours. There was thus obtained 1,3-dihydro-7-nitro-5-phenyl-2H-1,4-benzodiazepin-2-one melting at 224–226°.

Example 13

According to the procedure of Example 10 above, 2,3-dihydro-7-trifluoromethyl-5-phenyl-1H-1,4-benzodiazepine was reacted with chromium trioxide in sulfuric acid and glacial acetic acid. The reaction time was 30 minutes. The product was 1,3-dihydro-7-trifluoromethyl-5-phenyl-2H-1,4-benzodiazepin-2-one melting at 233–235°.

Example 14

According to the procedure of Example 9 above, 7-chloro-2,3-dihydro-1-methyl-5-phenyl-1H-1,4-benzodiazepine was reacted with chromium trioxide in dilute sulfuric acid and acetone. The reaction time was 3 hours. There was thus obtained 7-chloro-1,3-dihydro-1-methyl-5-phenyl-2H-1,4-benzodiazepin-2-one melting at 130–131°.

Example 15

According to the procedure of Example 9 above 7-chloro-1-methyl-5-phenyl-1,3,4,5-tetrahydro-2H-1,4-benzodiazepine was reacted with chromium trioxide in dilute sulfuric acid and acetone. The reaction time was 10 minutes. The reaction was conducted at room temperature. There was thus obtained 7-chloro-1-methyl-5-phenyl-1,3,4,5-tetrahydro-2H-1,4-benzodiazepin-2-one melting at 144–145°.

Example 16

A solution of 0.01 mole of 1,3,4,5-tetrahydro-5-(3-nitrophenyl)-2H-1,4-benzodiazepin-2-one in 200 ml. of glacial acetic acid was oxidized at room temperature with a solution of 0.075 mole of chromium trioxide in 2 ml. of water. The mixture was allowed to stand for 17 hours, diluted with water (0°) and made basic (pH 8) with ammonium hydroxide. The resulting product was extracted into dichloromethane, and the extract washed, dried, filtered and evaporated. The residue was then recrystallized from methanol giving 1,3-dihydro-5-(3-nitrophenyl)-2H-1,4-benzodiazepin-2-one as white prisms melting at 224–227°.

Example 17

5-(4-nitrophenyl-1,3,4,5-tetrahydro-2H-1,4-benzodiazepin-2-one was oxidized according to the procedure of Example 16 above yielding 1,3-dihydro-5-(4-nitrophenyl)-2H-1,4-benzodiazepin-2-one as pale yellow prisms melting at 279–281°.

Example 18

A solution of 2.1 g. of 2,3-dihydro-7-nitro-1H-1,4-benzodiazepine in a mixture of 50 ml. of pure acetone, 0.2 ml. of pyridine and 0.2 ml. of water was heated under reflux while 5.0 g. of potassium permanganate was added portionwise. The resulting mixture was refluxed for 40 min., cooled, and filtered over a filter aid (Celite). Solvents were removed under reduced pressure and the residual oil was dissolved in chloroform and filtered over neutral activated alumina. Starting material was recovered from the chloroform eluent and this solvent was used until no more material was obtained from the alumina. By changing the solvent to methanol, 1,3-dihydro-7-nitro-5-phenyl-2H-1,4-benzodiazepin-2-one was obtained, M.P. 223–225°.

We claim:
1. A method for the preparation of a compound selected from the group consisting of compounds of the formulae

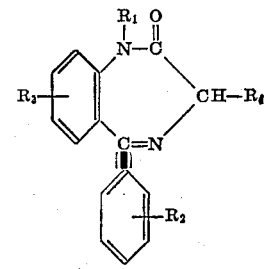

and

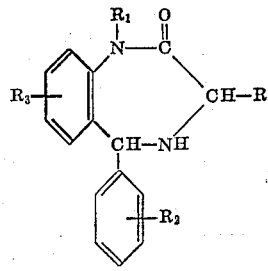

wherein $R_1$ and $R_4$ are each selected from the group consisting of hydrogen and lower alkyl; and $R_2$ and $R_3$ are each selected from the group consisting of hydrogen, halogen, lower alkyl, nitro and trifluoromethyl;

which comprises oxidizing with an agent containing in combination with oxygen a metal at a valence higher than its principal valence, said metal being selected from the group consisting of vanadium, chromium, manganese and lead, a compound selected from the group consisting of compounds of the formulae

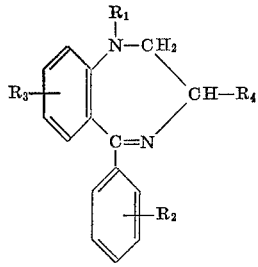

and

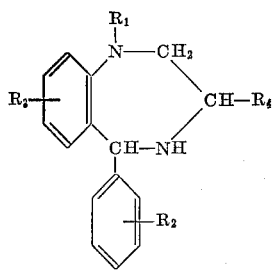

where $R_1$, $R_2$, $R_3$ and $R_4$ have the same meaning as above.

2. A process as in claim 1, wherein chromic acid is the oxidizing agent.

3. A process as in claim 2, wherein the chromic acid is in the form of chromium trioxide.

4. A process as in claim 2, wherein the chromic acid is formed in situ.

5. A process as in claim 4, wherein the chromic acid is formed from chromium trioxide and sulfuric acid.

6. A process as in claim 1, wherein the oxidizing agent is used in slight excess of the stoichiometric amount.

7. A process for the preparation of 1,3-dihydro-7-nitro-5-phenyl-2H-1,4-benzodiazepin-2-one, which comprises oxidizing 2,3-dihydro-7-nitro-5-phenyl-1H-1,4-benzodiazepine with chromic acid.

8. A process for the preparation of 7-chloro-1,3-dihydro-1-methyl-5-phenyl-2H-1,4-benzodiazepin-2-one, which comprises oxidizing 7 - chloro - 2,3 - dihydro - 1 - methyl-5-phenyl-1H-1,4--benzodiazepine with chromic acid.

9. A process for the preparation of 1,3-dihydro-5-phenyl - 7 - trifluoromethyl - 2H - 1,4 - benzodiazepin - 2-one, which comprises oxidizing 2,3-dihydro-5-phenyl-7-trifluoromethyl-1H-1,4-benzodiazepine with chromic acid.

References Cited by the Examiner
UNITED STATES PATENTS 3,121,076 2/1964 Keller et al. _____ 260—239.3
3,176,009 3/1965 Bell _____ 260—239.3

OTHER REFERENCES

Elderfield, Heterocyclic Compounds, vol. 6 (New York, 1957), page 492.
Groggins, Unit Processes in Organic Synthesis (New York, 1947), pages 429–430.

HENRY R. JILES, *Acting Primary Examiner.*
ALTON D. ROLLINS, *Assistant Examiner.*